(12) United States Patent
Korpi

(10) Patent No.: US 6,290,313 B1
(45) Date of Patent: Sep. 18, 2001

(54) TRACK END CONNECTOR

(75) Inventor: John G. Korpi, Livonia, MI (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/575,594

(22) Filed: May 22, 2000

(51) Int. Cl.[7] .................................................. B62D 55/205
(52) U.S. Cl. .......................................................... 305/204
(58) Field of Search .................................. 305/185, 202, 305/204; 59/78, 84, 85, 901

(56) References Cited

U.S. PATENT DOCUMENTS

| | | | | |
|---|---|---|---|---|
| 2,957,731 | * | 10/1960 | Backhaus | 305/204 X |
| 3,467,446 | * | 9/1969 | Seelbach | 305/204 X |
| 4,583,792 | * | 4/1986 | Erlenmaier et al. | 305/204 X |
| 4,838,623 | * | 6/1989 | Mineart | 305/204 |
| 6,223,517 | * | 5/2001 | Bogdan et al. | 59/85 |

\* cited by examiner

*Primary Examiner*—Russell D. Stormer
(74) *Attorney, Agent, or Firm*—David L. Kuhn; Gail S. Soderling; Clifford C. Carter

(57) ABSTRACT

An improved track end connector for a double-pin track assembly of a tracked vehicle includes a novel connector body, a bolt in the connector body, track pins held by the bolt, and a retainer ring engaging both the body and the bolt. The connector body defines a smooth bore having a relief groove holding the retainer ring. The bolt is inserted through the smooth bore until threads at one end of the bolt engage a second, threaded bore in the connector body. As the bolt screws into the threaded bore, a ramp near the bolt's head expands the retainer ring. As the bolt screws further into the threaded bore, a retention groove on the bolt is clinched by the retainer ring, so that the bolt can not unscrew from the threaded bore. A smooth shank portion of the bolt seats with concave depressions in the track pins, so that the track pins do not escape from the connector body.

3 Claims, 3 Drawing Sheets

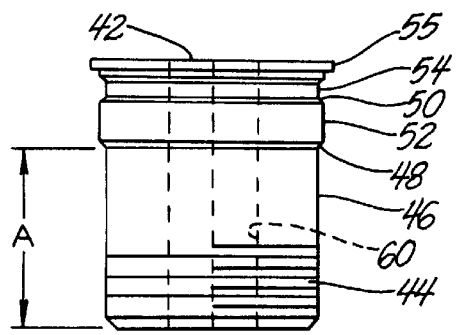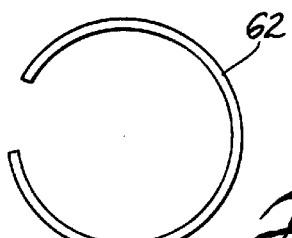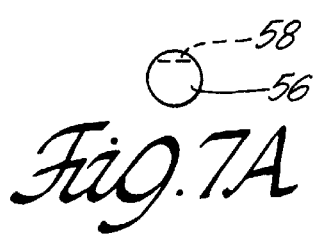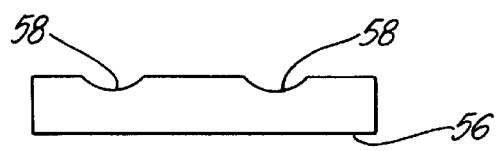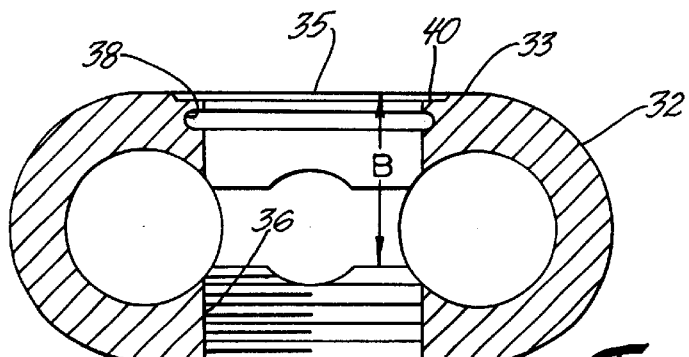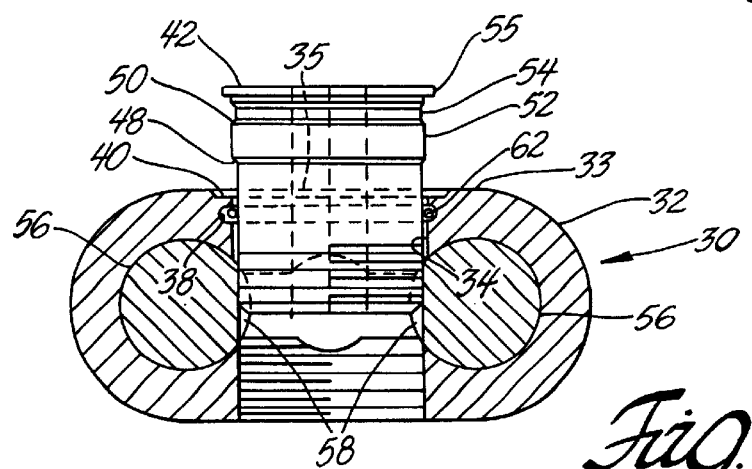

TRACK END CONNECTOR

GOVERNMENT USE

The invention described here may be made, used and licensed by the or for the U.S. Government for governmental purposes without paying me any royalty.

BACKGROUND

Track end connectors are used to secure pieces of track together in strands for tractive engagement with terrain by vehicles such as tanks. Several methods are used to secure the end connectors, the most common being that shown in FIG. 1. In this case the track pins are milled locally for engagement with a wedge. A bolt holds the wedge in a complementary slot in the track pin, so that the connector retains the track pin. A problem exists with the FIG. 1 design because if the bolt loosens, the wedge can disengage from the slot and the end connector can separate from the track. The track is thus broken and the tank is disabled. It is necessary to retorque the bolts often in order to avoid the problem. Experience has shown that retorquing the bolts causes the bolts' heads to break off, thereby leading to further difficulties.

SUMMARY

My improved track end connector eliminates the possibility that bolts will loosen and lead to track failure, and also eliminates the need to retorque bolts. My end connector includes a connector body, a specially designed bolt in the connector body, track pins held by the bolt, and a retainer ring engaging both the body and the bolt. The connector body defines a smooth bore having a relief groove, which holds a spring-like retainer ring. The bolt is inserted through the smooth bore until threads at one end of the bolt engage a second, threaded bore in the connector body. As the bolt screws into the threaded bore, a ramp near the bolt's head expands the retainer ring and subsequently a land adjacent the ramp maintains the ring in a fully expanded condition. Next, as the bolt screws further into the threaded bore a retention groove adjacent the land accepts the retainer ring, which contracts to its natural state when entering the retention groove. The retainer ring now prevents the bolt unscrewing from the threaded bore. One sidewall of the retention groove is also a second ramp adjacent the land. The second ramp allows the bolt to be unscrewed by an appropriate tool using a selected amount of torque. A smooth shank portion of the bolt seats with concave depressions in the track pins, so that the track pins do not escape from the connector body.

BRIEF DESCRIPTION OF THE DRAWINGS

FIG. 5 shows the bolt of my improved track end connector.

FIG. 6 shows the retainer ring used in the improved track end connector.

FIG. 7 shows a track pin having concave depressions to accommodate the bolt shown in FIG. 5, and FIG. 7A shows and end view of the pin shown in FIG. 7.

FIG. 8 is a sectioned view of the connector body of the improved track end connector.

FIGS. 9 through 12 are sectioned views of the improved track end connector showing juxtapositions of elements as the bolt is inserted progressively further into the connector.

DETAILED DESCRIPTION

Figure 1:
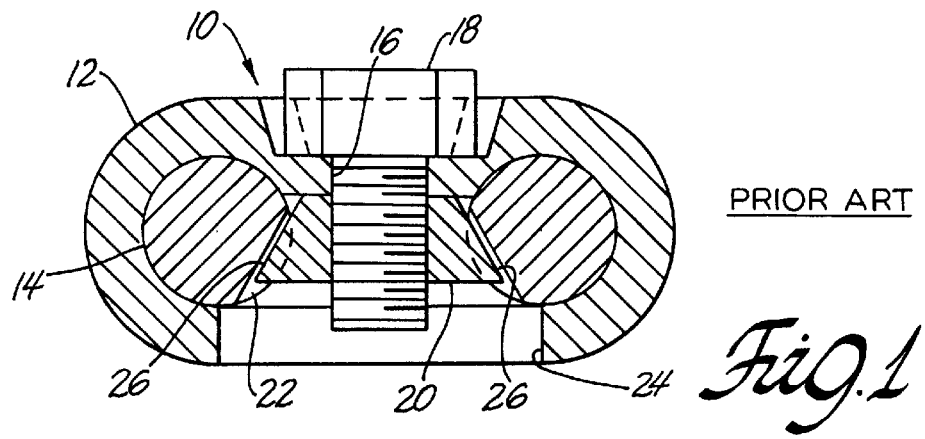
FIG. 1 shows a partly sectioned side view of a conventional track end connector.
Figure 2:
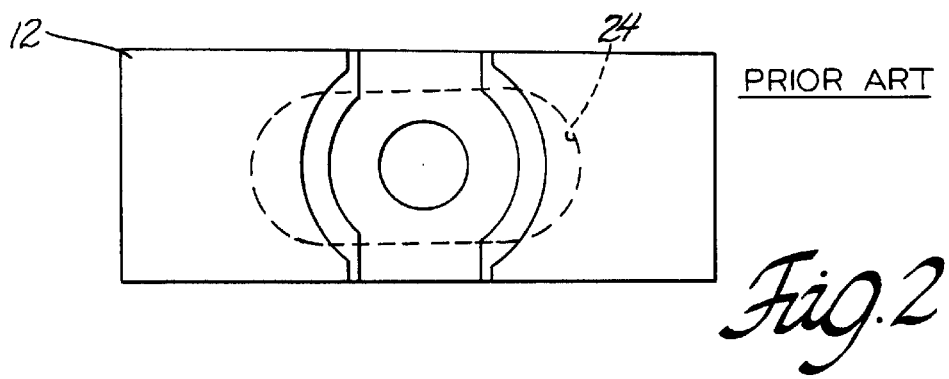
FIGS. 2, 3 and 4 show, respectively, the top, side and bottom elevational views of the connector body of the conventional connector.
Figure 3:
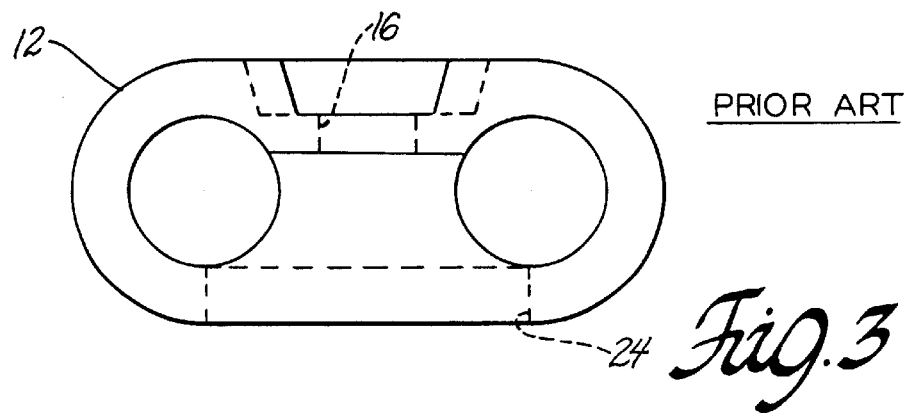
Figure 4:
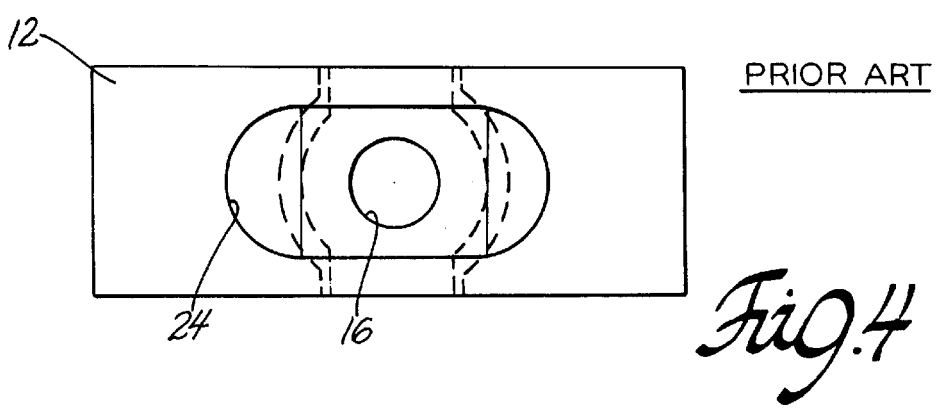

FIG. 1 shows a conventional track end connector 10 comprising a connector body 12 closely receiving track pins 14, which in turn engage track shoes (not shown) of a double pin track assembly for vehicles such as tanks. The top of body 12 defines an aperture 16 into which bolt 18 is inserted, and within the connector body is a wedge 20 that threads with bolt 18. Sides 26 of the wedge fit into complementary slots 22 milled in the track pins so that the track pins are retained by body 12. Loosening bolt 18 allows wedge 20 to be removed from the bolt and dropped out of body 12 through oval aperture 24, whereupon the body can be slid axially from the track pins 14.

FIG. 9 shows my improved track end connector 30, and FIGS. 5 through 8 show individual components of connector 30. As best seen in FIG. 8, connector 30 has a body 32 similar in overall shape and size to conventional connector body 12. Body 32 defines two axially aligned bores 34 and 36. Bore 34 has a smooth surface interrupted by annular relief groove 38 and has a shoulder 40 at the bore's outer end. Bore 36 is spaced from bore 34 and is threaded. A specially designed bolt 42, shown in FIG. 5, passes through bore 34 and threads with bore 36. Bolt 42 has threads 44 only at the end and the bolt's shank 46 defines a smooth section between the threads 44 and annular bolt ramp 48. The bolt has a second ramp 50 and a land 52 between the ramps, ramp 50 forming part of annular retainer groove 54. The head of bolt 42 has a flange 55 and the bolt defines a hexagonal through bore 60, which allows the bolt to be turned by an Allen wrench or like tool.

FIG. 9 shows bolt 42 partly inserted into body 32 such that the bolt engages track pins 56 via a close fit with rounded, concave depressions 58. Retainer ring 62 is in relief groove 38 and is in its free state.

Figure 10:
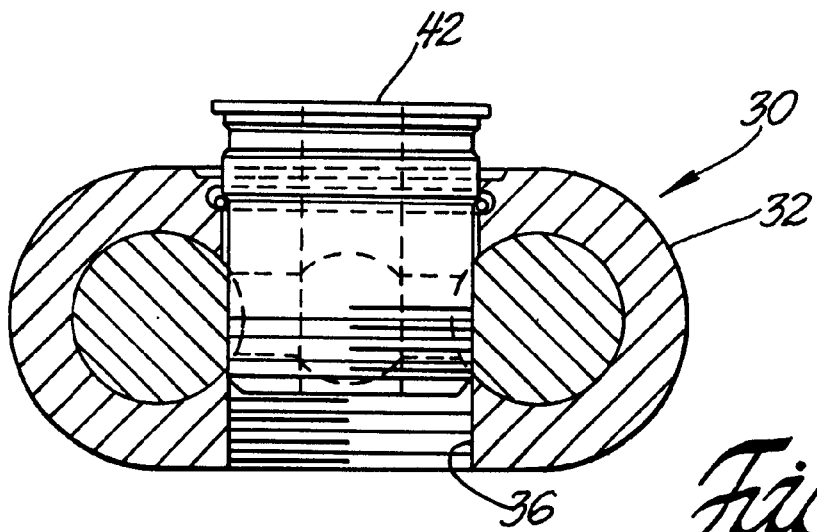

In FIG. 10, bolt 42 has been inserted further into body 32, so that threads 44 partly engage bore 36 and ramp 48 contacts retainer ring 62. The distance "A" (FIG. 5) between one end of bolt 42 and ramp 48 is greater than the distance "B" (FIG. 8) between the opening 35 of bore 34 at body upper face 33. Consequently, bolt 42 is configured such that threads 44 begin engaging bore 36 before ramp 48 contacts retaining ring 62. As bolt 42 is screwed further into body 32, ramp 48 overcomes the spring force of retainer ring 42 and expands the ring.

Figure 11:
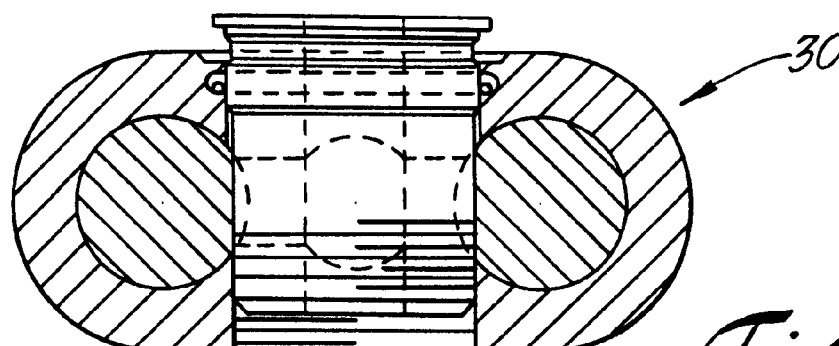

In FIG. 11, bolt 42 has been screwed into body 32 such that land 52 bears against retainer ring 62, which has expanded to the maximum extent. Preferably, land 52 fits closely against bore 34 as well. Relief groove 38 is deep enough to accept the maximum expansion of ring 62. Preferably, groove 38 is at least as deep as the radial width of ring 62, as is the case in FIG. 11.

Figure 12:
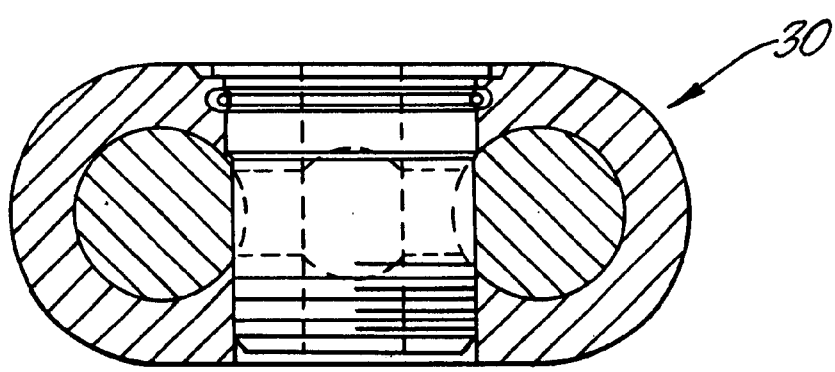

In FIG. 12, bolt 42 has been screwed completely into body 32, so that retainer ring has contracted into engagement with retainer groove 54 and so that flange 55 bears against shoulder 40. Only the smooth portions of shank 46 engage depressions 58 in track pins 56. It may be preferred that, as seen in FIG. 12, the flanged end of bolt 42 is flush with body 32. It is permissible for bolt 42 to loosen or unscrew from body 32 by a limited amount, until ramp 50 squeezes ring 62 against an upper sidewall of groove 38. Any tendency for bolt 42 to further loosen from body 32 is overcome by the spring force of retainer ring 62 acting upon ramp 50.

I wish it to be understood that I do not desire to be limited to the exact details of construction or method shown herein since obvious modifications will occur to those skilled in the relevant arts without departing from the spirit and scope of the following claims.

What is claimed is:

1. A track end connector, comprising:

a connector body having an external face;

a first, threaded bore in the connector body;

a second bore in the connector body axially aligned with the first bore, the second bore having an opening at the external face;

an annular relief groove in the second bore;

a bolt engaged with the bores;

track pins held by the body and engaged by the bolt;

threads on the bolt;

a land on the bolt;

a retention groove on the bolt adjacent the land;

an expandable retainer ring in the annular relief groove, the ring engaging the bolt; and a ramp between the threads and the land;

wherein a distance from one end of the bolt to the ramp is greater than a distance from the opening of the second bore to the first bore.

2. A track end connector, comprising:

a connector body having an external face;

a first, threaded bore in the connector body;

a second, smooth bore in the connector body axially aligned with the first bore, the second bore having an opening at the external face;

an annular relief groove in the second bore;

a bolt engaged with the bores, the bolt having one end and an opposite, other end;

track pins held by the body and engaged by the bolt;

threads at the one end of the bolt;

a land on the bolt;

a retention groove on the bolt adjacent the land;

an expandable retainer ring in the annular relief groove, the ring engaging the bolt;

a smooth shank portion of the bolt intermediate the threads and the other end of the bolt;

a concave depression in the track pin in which fits the smooth shank portion; and a ramp between the smooth shank portion and the land;

wherein a distance from the one end to the ramp is greater than a distance from the opening of the second bore to the first, threaded bore.

3. A track end connector, comprising:

a connector body having an external face;

a first, threaded bore in the connector body;

a second, smooth bore in the connector body axially aligned with the first bore and spaced therefrom, the second bore having an opening at the external face;

an annular relief groove in the second bore;

a bolt engaged with the bores, the bolt having one end and an opposite, other end;

track pins held by the body and engaged by the bolt;

threads only at the one end of the bolt;

an annular land on the bolt;

a retention groove in the bolt, one side wall of the retention groove being a first ramp adjacent the land;

an expandable retainer ring in the annular relief groove, the ring engaging the bolt, wherein a depth of the relief groove is at least as great as a radial width of the ring;

a smooth shank portion of the bolt intermediate the threads and the other end of the bolt;

a concave depression in the track pin in which fits the smooth shank portion; and a second ramp ramp between the smooth shank portion and the land;

wherein a distance from the one end to the second ramp is greater than a distance from the opening the first, threaded bore.

* * * * *